United States Patent [19]
Wallace et al.

[11] Patent Number: 4,765,581
[45] Date of Patent: Aug. 23, 1988

[54] UNIVERSAL CUP HOLDER WITH CUP HANDLE SLOT

[75] Inventors: Robert S. Wallace, Los Angeles, Calif.; Ian C. Goldey; Terri L. Nelson, both of 6550 #1, Vanalden St., Reseda, Calif. 91335

[73] Assignees: Ian C. Goldey; Terri L. Nelson, both of Reseda, Calif. ; part interest to each

[21] Appl. No.: 18,029

[22] Filed: Feb. 24, 1987

Related U.S. Application Data

[63] Continuation-in-part of Ser. No. 800,712, Nov. 22, 1985, Pat. No. 4,655,425.

[51] Int. Cl.[4] ............................................. A47K 1/05
[52] U.S. Cl. ................................ 248/311.2; 248/310; 248/308
[58] Field of Search ................. 248/311.2, 310, 210, 248/211, DIG. 12, 308, 312.1; D7/70

[56] References Cited

U.S. PATENT DOCUMENTS

| | | | |
|---|---|---|---|
| 1,619,099 | 3/1927 | Beck | 248/310 |
| 1,644,665 | 10/1927 | Beck . | |
| 1,847,471 | 3/1932 | Chafee . | |
| 2,277,738 | 3/1942 | Wilkinson . | |
| 2,302,170 | 11/1942 | Basler . | |
| 2,532,244 | 11/1950 | Pasmore . | |
| 2,788,189 | 4/1957 | Groya . | |
| 3,013,359 | 12/1961 | Cross et al. . | |
| 3,036,717 | 5/1962 | Johnson . | |
| 3,239,181 | 3/1966 | Ellerbrock | 248/210 |
| 3,317,171 | 5/1967 | Kramer . | |
| 3,319,913 | 5/1967 | Schoepe et al. . | |
| 4,515,335 | 5/1985 | DeRosett | 248/310 X |
| 4,606,523 | 8/1986 | Statz et al. | 248/311.2 |
| 4,629,153 | 12/1986 | Marcum | 248/311.2 X |
| 4,634,089 | 1/1987 | Wright et al. | 248/311.2 |

Primary Examiner—Alvin C. Chin-Shue
Attorney, Agent, or Firm—William W. Haefliger

[57] ABSTRACT

A universal holder for a cup that has a handle and a side wall, comprises:
(a) a generally horizontal base to support a cup in a zone above the base,
(b) an upright frame attached to the base,
(c) a retainer attached to the frame and extending generally above the base to retain the cup wall, the retainer extending about that zone and forming a generally upright slot to guidably downwardly receive the cup handle,
(d) and the frame attachable to a vehicle.

12 Claims, 3 Drawing Sheets

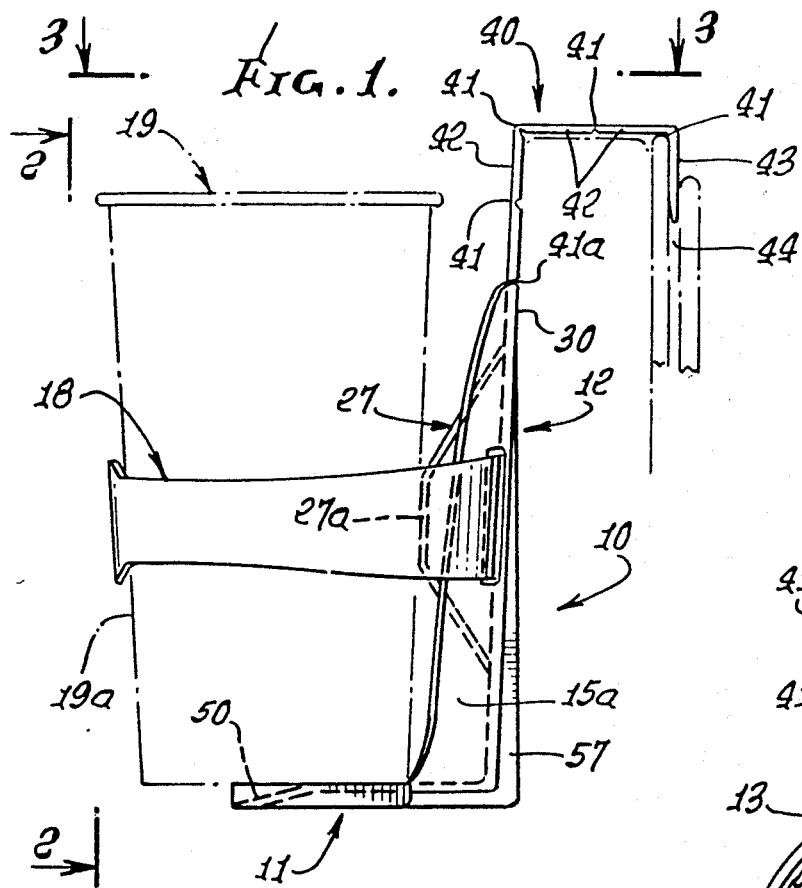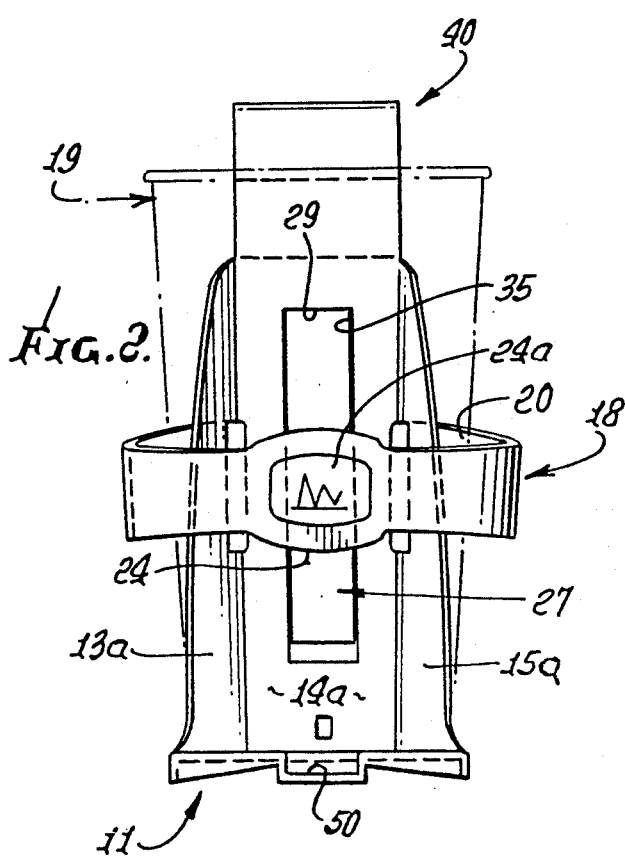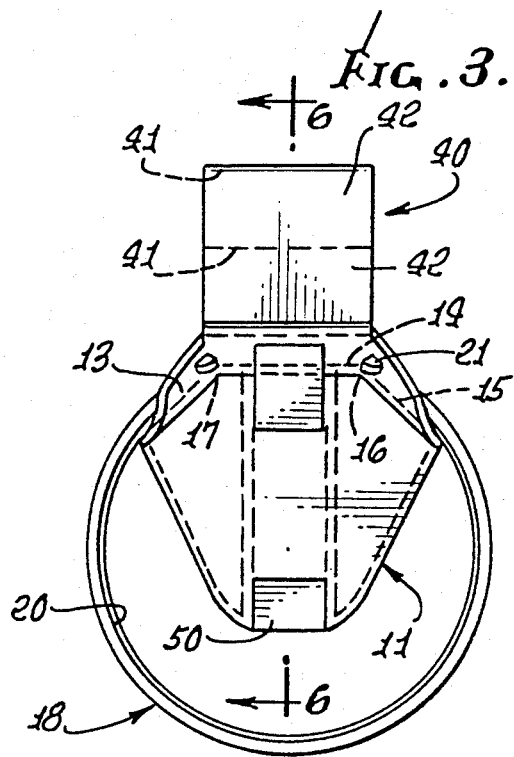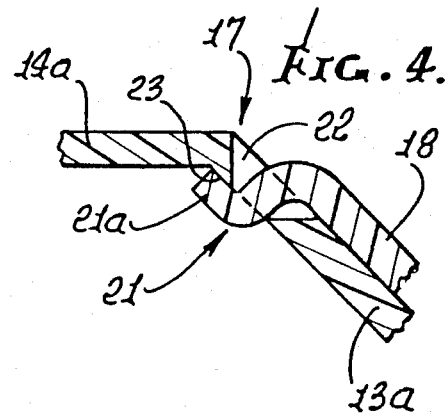

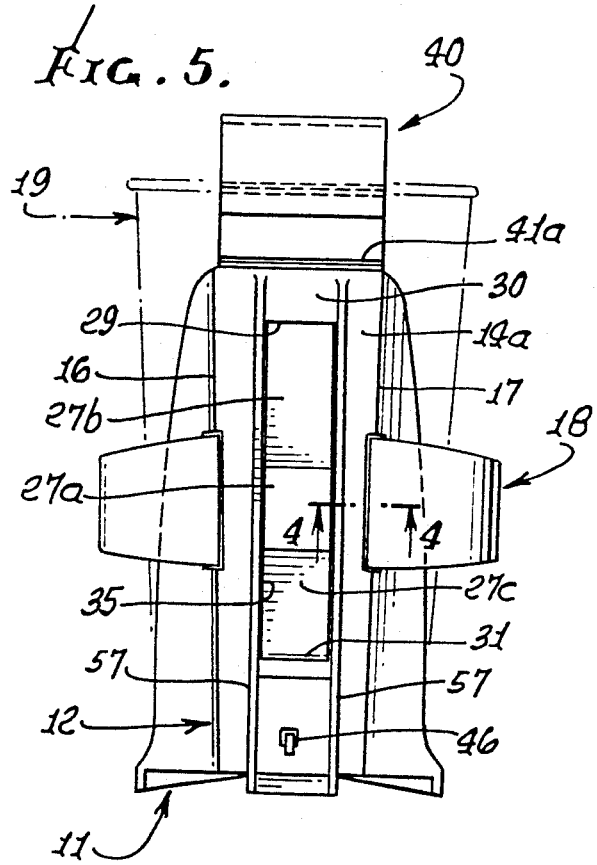
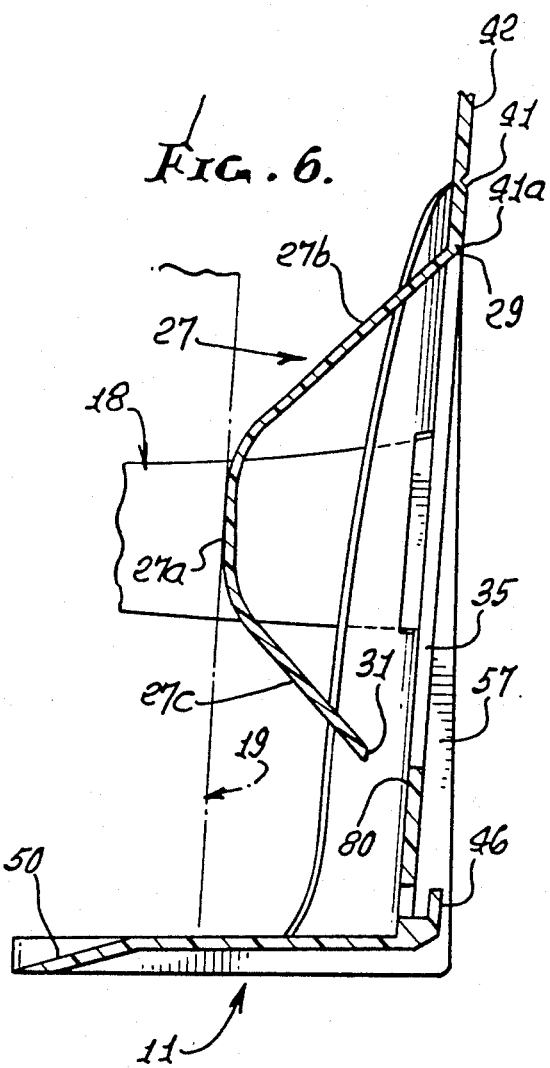
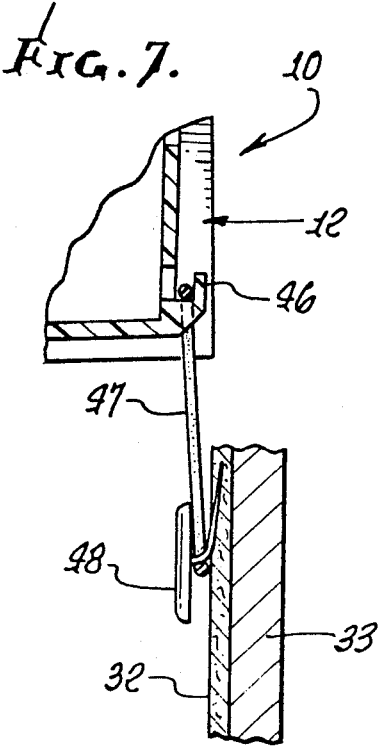
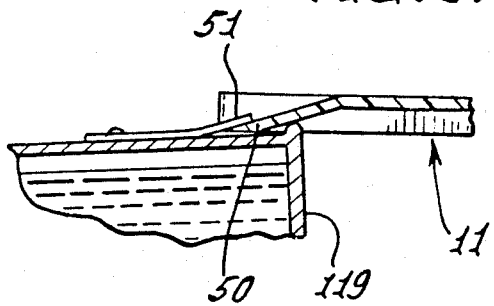

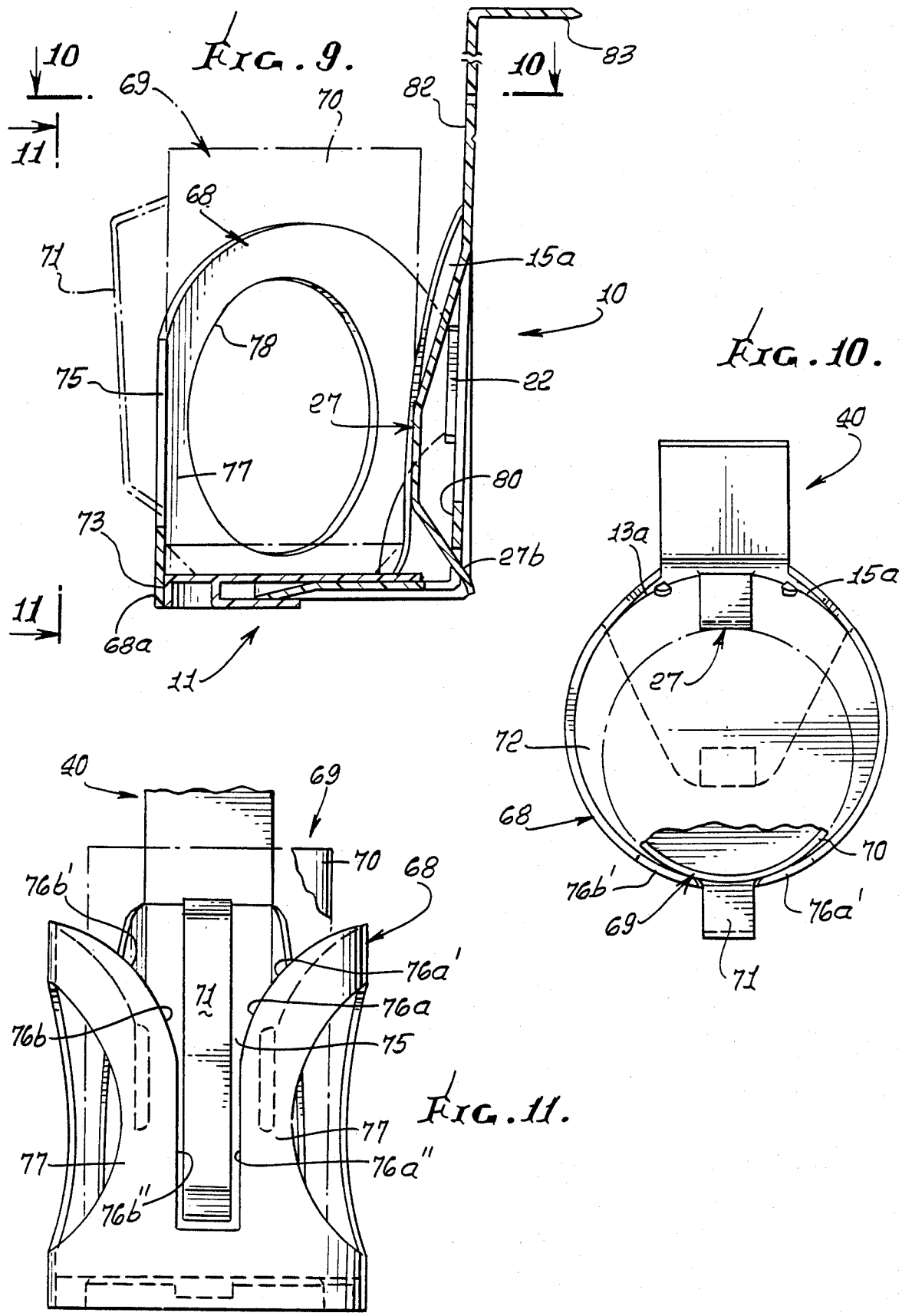

UNIVERSAL CUP HOLDER WITH CUP HANDLE SLOT

BACKGROUND OF THE INVENTION

This application is a continuation-in-part of Ser. No. 800,712 filed Nov. 22, 1985, U.S. Pat. No. 4,655,425 issued 4/7/87.

This invention relates generally to cup or can supports, and more particularly to a support which is suspended by a vehicle door, and adjustably and firmly retains or holds cans or cups of different sizes in secure, upright position, adjacent the vehicle door.

There is need for devices of the above type, in order to prevent inadvertent overturning and spilling of liquid filled drinking cups or cans, in vehicles. Such accidents can easily occur when the can or cup is bottom supported on the vehicle seat or floor, vehicle motion inducing overturning of the can or cup.

There is also need for such a device which is exceedingly simple in construction easy to produce, and easy to use and store in vehicles.

SUMMARY OF THE INVENTION

It is a major object of the invention to provide apparatus meeting or satisfying the above needs. Basically, it comprises:

(a) a generally horizontal base to support a cup that has a handle, and in a zone above the base, (b) an upright frame attached to the base, (c) a retainer attached to the frame and extending generally horizontally above the base to retain the cup wall, the retainer extending about that zone and forming a generally upright slot to guidably downwardly receive the cup handle, (d) and the frame attachable to a vehicle door.

As will be seen, the attachment means may with unusual advantage comprise a flap integral with the frame, the flap consisting of molded plastic, and located opposite the handle guide slot. That slot is typically defined between retainer edges that receive or taper downwardly toward one another, and away from the frame, as will appear.

It is another object to provide a pusher element to have hinged attachment to the frame, and with a portion projecting away from the cup to engage the side of the frame; the pusher is typically bowed toward the cup, and the frame has a rear panel defining a slot to allow adjustment swinging of the pusher. In this regard, the frame may typically extend upwardly in the form of multiple thin panels to stiffen the frame and the cantilevered base against downward flexing under loading imposed by a liquid filled cup; and one panel may also support the pusher to swing, with other panels supporting the retainer to have releasable attachment to the frame, whereby detachment of the retainer strap facilitates ease of storage of the device.

These and other objects and advantages of the invention, as well as the details of an illustrative embodiment will be more fully understood from the following specification and drawings, in which:

DRAWING DESCRIPTION

FIG. 1 is a side elevation;

FIG. 2 is an end elevation on lines 2—2 of FIG. 1;

FIG. 3 is a top plan view on FIGS. 3—3 of FIG. 1;

FIG. 4 is a fragmentary section on lines 4—4 of FIG. 5, flap connection to the frame;

FIG. 5 is a rear elevation;

FIG. 6 is a vertical section on lines 6—6 of FIG. 3;

FIG. 7 is a view showing auxiliary resilient retention of the cup holder to a door;

FIG. 8 is a fragmentary section showing use of the holder to open a cold drink can top;

FIG. 9 is a view like FIG. 1, showing a modification;

FIG. 10 is a view like FIG. 3, and taken on lines 10—10 of FIG. 9; and

FIG. 11 is an elevation taken on lines 11—11 of FIG. 9.

DETAILED DESCRIPTION

The unusual cup holder example as shown in the drawings at 10 includes a generally elongated base 11 to support a cup; and an upright frame 12 integrally molded to the rear of the base, as at 13, 14 and 15. The frame extends upwardly in three panels 13a, 14a and 15a, all integrally molded as unit, and connected at upright corners 16 and 17. This construction prevents flexing of the frame, and downward flexing of the base relative to the frame, under loading exerted by a liquid filled cup 19.

A retainer 18 is attached to the frame and extends generally horizontally above the base to retain the wall 19a of cup 19. The retainer may advantageously comprise a thin flexible plastic strap extending in a loop as shown, so as to have a loop-shaped, upright, flat inner wall 20 to firmly contact and orient the wall of the cup. The ends 21 of the retainer may advantageously interfit vertical slots in the frame, proximate the corners 16 and 17. See FIG. 4 showing retainer strap L-shaped end 21 projecting through slot 22 in panel 13a adjacent corner 17. Tang 21a on end 21 flatly engages the inner side of panel 13a, at 23, as shown. Enlargement 24 on the strap may receive an advertising decal 24a.

A resilient pusher element 27 is supported by the frame 12 to engage the cup rear wall and urge the cup forwardly (leftwardly in FIG. 1) toward the retainer strap. As shown, the pusher element 27 may consist of thin plastic material which has a mid-portion 27a bowed toward the cup rear wall to resiliently engage the latter. Pusher element 27 has a top portion 27b with plastic hinged attachment at 29 to the lower edge of a crosspiece 30 formed by panel 14a (see FIGS. 5 and 6). The lower portion 27c of the pusher element projects away from the cup to have termnal 31 slidably engagable with the frame surface 80 to slide downwardly as the pusher is resiliently compressed by a cup. The pusher swings in a vertical, front to rear direction or plane to adjust to the door side and the cup, being resiliently flexed or bowed therebetween A slot 35 in panel 14a allows such adjustment swinging.

Means is also provided to attach the frame to the car or vehicle door. Such means may advantageously take the form of a flap 40 integral with the frame. As shown, the flap consists of molded plastic and defines a plurality, of thin, parallel plastic hinges 41 integral with and interconnecting flap segments 42, allowing ease folding of the flap to the door contour. See FIG. 1. The hinges are spaced apart along the flap length, and the end portion 43 of the flap may fit downwardly into a window frame slot 44. A hinge 41a attaches the flap to the upper extent 30 of the panel 14a.

A tang 46 on the frame panel 14a, near its lowermost extent may receive a loop, such as rubber band 47, to resiliently or otherwise urge or hold the frame in a downward position adjacent the vehicle door 33. A tack 48 pushed into the door upholstery 32, holds the lowermost end of the band 47 downwardly. See FIG. 7.

The base 11 may have a locally forwardly tapered edge portion 50 adapted to be inserted under a pop top closure on a cold drink can 119, to lift that closure 51, by leverage exertion as between the can and base 11. See FIG. 8.

Note the two upright stiffening ribs 57 integral with rear panel 14a and which are configured to engage the side of the vehicle door to support the apparatus, sidewardly.

Elements seen in FIGS. 9-11 corresponding to the same or similar elements in FIGS. 1-3, bear the same numbers. Note that the modified cup 69 has an outer wall 70 and a handle 71. The modified retainer strap 68 is attached to the frame, as in FIG. 4, and extends about the cup reception zone 72 above the base 11. The strap lowermost extent 68a fits against the annular wall 73 defined by the base. Opposite ends of the strap 68 typically are formed as at 21 and 21a in FIG. 4, to releasably fit into grooves or slots 22 in panels 13a and 15a.

The strap 68 forms a generally upright slot, as at 75, to guidably downwardly receive the cup handle 71 which also extends generally upright. The strap has edges 76a and 76b the upper extents of which curve downwardly at 76a' and 76b' and away from the frame, and toward one another, to guide and center the cup handle as the cup body is dropped into the zone 72, the handle projecting through the guide slot 75. Lower extents 76a" and 76b" of the slot extend generally parallel to one another to define the lower extent of the slot 75, slightly larger in width than the handle. The sides 77 of the strap 68 contain large cut-outs at 78 to facilitate wrapping of the strap about zone 72, as shown.

Finally, note the lower extent 27b of the pusher 27 projecting beneath a lower edge 80 of the panel 14a.

The apparatus can be attached to vehicle parts other than window sills or door. For example, it can be attached to the handle bar or bars of bicycles, such as at the mid-portion thereof.

A horizontal slot 82 in flap 40 is of a width to frictionally receive the L-shaped tang 83 on the end of the flap, thereby to define a loop. This affords an alternate connection to a glove-compartment handle or other member in the vehicle.

We claim;

1. In a universal cup holder, the combination comprising
    (a) a generally horizontal base to support a cup having a wall, and an upright handle,
    (b) an upright frame attached to the base, whereby the base is part of the frame,
    (c) a retainer attached to the frame and extending above the base to retain the cup wall,
    (d) a resilient pusher element supported by the frame to engage the cup wall and urge the cup toward the retainer,
    (e) and means attached to the frame to attach the holder to a vehicle door,
    (f) the retainer forming a generally upright slot to guidably downwardly receive the cup handle, vertically,
    (g) said pusher having hinged attachment to the frame whereby the pusher may swing toward and away from the retainer extent furthest from the frame,
    (h) the pusher being vertically bowed toward said slot, the lower portion of the pusher extending downwardly to engage the frame,
    (i) the frame having a rear central panel defining a slot toward and away from which the pusher is swingable as accomodated by said hinged attachment,
    (j) the frame extending upwardly and having side panels connected to the base, the central panel swingably supporting the pusher,
    (k) the retainer being formed of molded plastic and having opposite ends engaging and biased by said two side panels which are angled relative to the central panel to direct the retainer in loop configuration,
    (l) the retainer having two edges between which the guide slot is formed, uppermost extents of said two edges curving downwardly and away from the frame, and toward one another and said edges being continuous and terminating proximate the base, the guide slot being in alignment with said pusher and the slot in the frame rear central panel.

2. The combination of claim 1 wherein said resilient pusher element has a lower portion projecting away from the cup to slidably engage the frame.

3. The combination of claim 1 wherein the retainer ends have releasable attachment to the frame.

4. The combination of claim 1 including a resilient member attached to the frame and also attached to an element on a vehicle door side to resiliently urge the frame toward the door side.

5. The combination of claim 1 wherein the frame attaches to a vehicle door by means comprising a flap integral with the frame, and extending above the level of the retainer slot.

6. The combination of claim 5 wherein the flap consists of molded plastic and defines a plurality of thin plastic hinges which extend in generally parallel relation and spaced apart along the flap length.

7. The combination of claim 5 wherein said flap and said frame are a one-piece integrally molded unit.

8. The combination of claim 1 including an upright flap carrying the frame and attachable to a vehicle part.

9. The combination of claim 8 including a slot in the flap to receive end extent of the flap to form a loop for reception of a vehicle part.

10. In a universal cup holder, the cup having a handle and an outer wall, the combination comprising;
    (a) a generally horizontal base to support a cup in a zone generally above the base,
    (b) an upright frame attached to the base, whereby the base is part of the frame,
    (c) a retainer attached to the frame and extending generally horizontally above the base to retain the cup wall, the retainer extending about said zone and forming a generally upright slot to guidably downwardly receive the cup handle,
    (d) a resilient pusher supported by the frame to engage the cup wall and urge the cup toward the retainer,
    (e) and means attached to the frame to attach the holder to a vehicle door,
    (f) the retainer being a strap,
    (g) said pusher having hinged attachment to the frame to extend opposite said guide slot whereby the pusher may swing toward and away from said slot, (h) the pusher being vertically bowed toward said zone and lower portion of the pusher extending downwardly proximate the lower extent of said zone,
(i) the frame having a rear central panel defining a slot toward and away from which the pusher is movable as accomodated by said hinged attachment,
(j) the frame extending upwardly and having two side panels connected to the base, the central panel swingably supporting the pusher,
(k) the retainer being a molded plastic strap having opposite ends engaging and biased by said two side panels which are angled relative to the central panel to direct the strap in loop configuration,
(e) and the retainer strap having edges between which said guide slot for the cup handle is formed, upper extents of said edges curving downwardly and away from the frame, and toward one another to locate the cup handle opposite the pusher as the cup is lowered into the slot.

11. The combination of claim 10 wherein said retainer has inwardly bowed and relieved side walls.

12. The combination of claim 11 wherein lower extents of said edges extend downwardly at approximately the same spacing from one another.

* * * * *